United States Patent [19]

Kogo et al.

[11] 3,760,109

[45] Sept. 18, 1973

[54] TIME DIVISION MULTIPLEX TRANSMISSION SYSTEM

[75] Inventors: Hiroshi Kogo, Toshima-ku, Tokyo; Kuniyuki Tanabe, Minami-ku, Yokohama, both of Japan

[73] Assignee: Nissan Motor Company, Limited, Kanagawa-ku, Yokohama City, Japan

[22] Filed: Nov. 15, 1971

[21] Appl. No.: 198,781

[52] U.S. Cl............................ 179/15 BA, 179/15 A

[51] Int. Cl............................................. H04j 3/04

[58] Field of Search...................... 179/15 A, 15 AP, 179/15 BA, 15 BS

[56] References Cited

UNITED STATES PATENTS 3,602,647 8/1971 Kawashima .................... 179/15 BS

*Primary Examiner*—Ralph D. Blakeslee

*Attorney*—McCarthy, Depaoli, O'Brien & Price

[57] ABSTRACT

A system in which each single pulse generator is provided for producing each one single pulse representing each one information, which system including a transmitter consisting of at least two pulse signal generators for producing separate pulse signals each within a pulse duration of the single pulse on each channel, and at least two coding units provided in each channel for converting the pulse signals into corresponding binary coded signals, and a receiver consisting of at least two decoding units provided in each channel for reconverting the transmitted binary coded signals into original pulse signals.

4 Claims, 6 Drawing Figures

TIME DIVISION MULTIPLEX TRANSMISSION SYSTEM

This invention relates to multipex transmission systems and, more particularly, to a time division multiplex system for transmitting various instructions in time division.

In conventional control systems for controlling various electric equipments such as, for example an ignition coil, a wiper arm, a windshield washer, a parking light, a head lamp, a tail lamp, a stop lamp and turn signal lamp of an automotive vehicle, a number of wires are employed for the conveyance of various signals or informations to be utilized for controlling the desired electric equipments. These wires are disposed between the electric equipments and associated actuating switches mounted on a control panel, respectively, thus resulting in a complicated construction and arrangement as a whole. This is reflected by a low production efficiency and by a high production cost. To eliminate these drawbacks encountered in the prior art, provision has been made to separate the number of wires into two groups for transmitting the various instructions and for receiving the transmitted instructions. This provision is still disadvantageous in that it is difficult to increase the production efficiency especially where a number of electric equipments is employed. Accordingly, it is preferable to transmit various control signals through the use of at least one transmission line. Among the conventional multiplex transmission systems, there exist a frequency division system and a time division system. The frequency division system has an advantage in that it contributes to a simplified construction. However, such a system is more subject to noise problems occasioned by interferences which tends to erroneously vary the characteristics of the received control signals. On the contrary, the time division system is advantageous in that it is less subject to the noise problems and thus it is highly reliable in operation. However, the time division system requires that synchronization signals be provided such that the original instructions may be produced at the receiving point in a reliable manner, thus resulting in a complicated construction and in high production cost.

It is, therefore, an object of this invention to provide an improved time division multiplex transmission system.

Another object of this invention is to provide a time division multiplex transmission system which is simplified in construction.

Another object of this invention is to provide a time division multiplex transmission system which is highly reliable in operation.

Still another object of this invention is to provide a time division multiplex transmission system which obviates the need for provision of synchronization devices.

According to this invention, the time division multiplex system includes a plurality of single pulse generators, one for each channel, adapted to produce separate single pulses in response to different instructions in each channel. The single pulses are delivered to pulse signal generators of a transmitter in which pulse signals are produced in a predetermined time sequence. The transmitter includes a plurality of coding units, one for each channel, and which are connected to the pulse signal generators. Each of the coding units converts the pulse signal into a corresponding binary coded signal. The binary coded signal is passed through at least one transmission line to a receiver which consists of a plurality of decoding units each provided in each channel. The decoding unit re-converts the binary coded signal into the corresponding original pulse signal, which is delivered to a desired utilization device.

Figure 1:
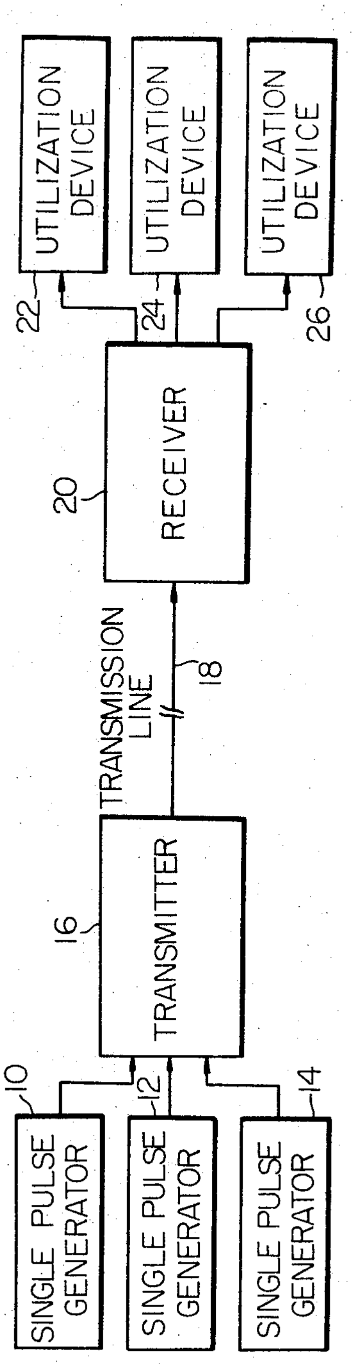
FIG. 1 is a block diagram of a time division multiplex transmission system according to this invention.

Referring now to FIG. 1, there is schematically shown a preferred emvodiment of a time division multiplex system according to this invention, which includes single pulse generators 10, 12 and 14. The single pulse generators 10, 12 and 14 are arranged in such a manner as to produce separate single pulses which respectively represent different informations. These single pulses are supplied to a transmitter 16. The transmitter 16 includes means for producing pulse signals each within a pulse duration of the single pulse in such a manner that the pulse signals are separated from each other by a predetermined delay time. The transmitter 16 further includes means for converting the pulse signals into corresponding binary coded signals which are arranged to appear within a time period less than the predetermined delay time of the pulse signal. The binary coded signals are separately transmitted in a time sequence through a transmission line 18 to a receiver 20. The transmission line 18 may consist of a pair of wires or it may be wireless. The receiver 20 is arranged to reconvert the transmitted binary coded signals into corresponding original pulse signals which are supplied to utilization devices 22, 24 and 26. The utilization devices may be any necessary devices including electric equipments of, for example, an automotive vehicle, a ship, an air craft or a building.

Figure 2A:
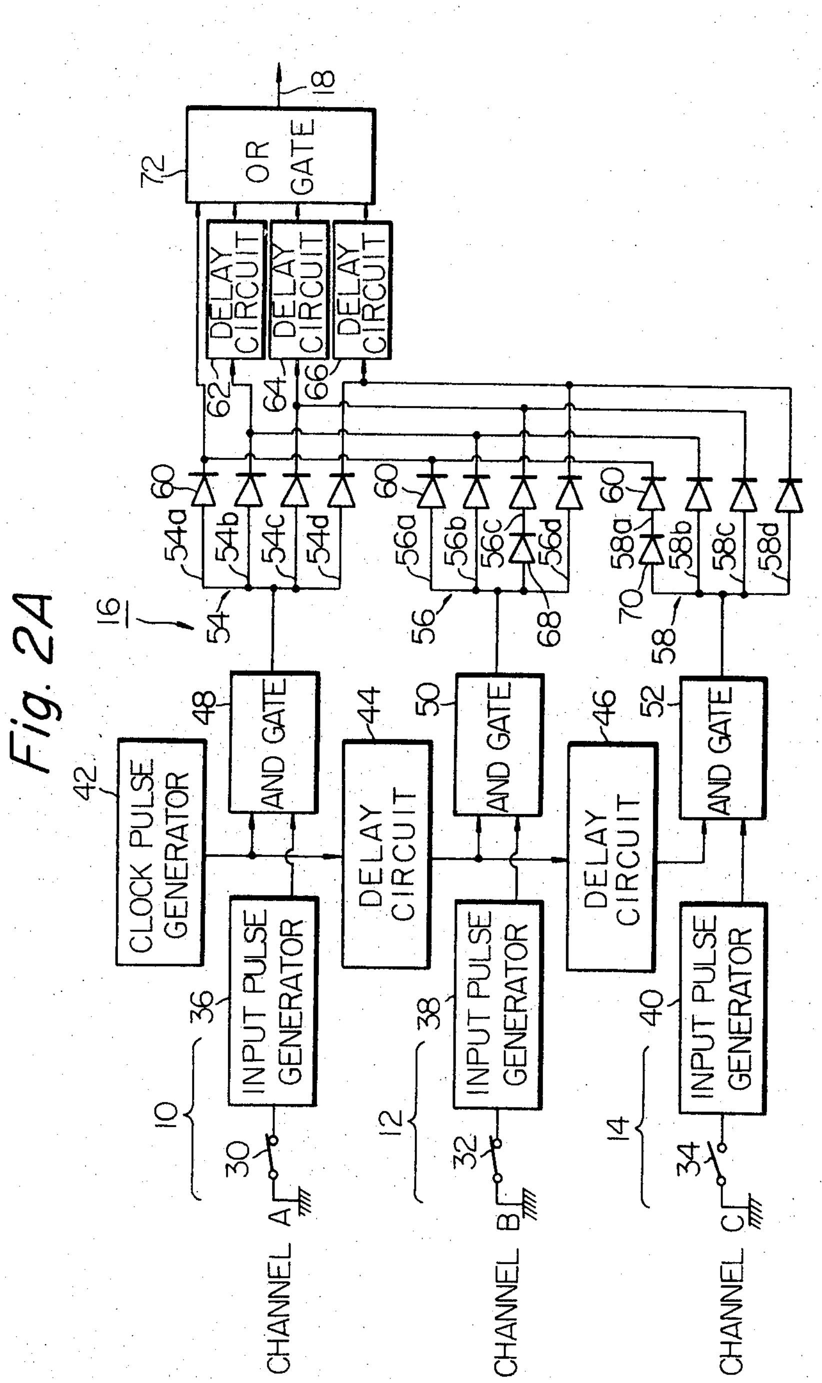
FIG. 2A is a circuit diagram of a transmitter forming a part of the system shown in FIG. 1.
Figure 3:
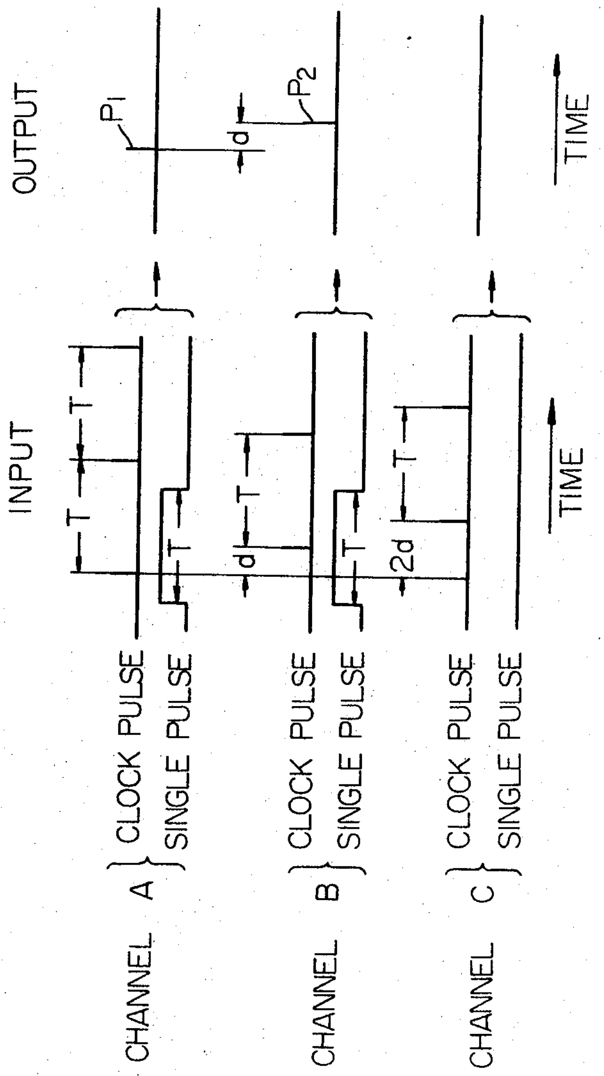
FIG. 3 is a diagram illustrating wave forms to be used in the transmitter shown in FIG. 2A.

The transmitter forming a part of the time division multiplex system is shown in greater detail in FIG. 2A. As seen from FIG. 2A, the single pulses are produced on channels A, B and C by the associated single pulse generators 10, 12 and 14. In the illustrated embodiment, three channels are shown for the sake of convenience of illustration. It should be appreciated that more than two channels can be employed according to the desired applications since the time division multiplex system of this invention basically constitutes of at least two channels as will be apparent from the description hereinafter. The single pulse generators 10, 12 and 14 include switch circuits 30, 32 and 34 which are disposed in the channels A, B and C, respectively. The single pulse generators also include input pulse generators 36, 38 and 40 which are connected to the switch circuits 30, 32 and 34 and associated therewith, respectively. The switch circuits are responsive to different informations desired for performing control functions. The input pulse generators are arranged in known fashion so as to produce pulse signals each having a predetermined pulse duration T as shown in FIG. 3. These single pulses are supplied to associated component parts of the transmitter 16 for subsequent use.

The transmitter 16 includes means consisting of a clock pulse generator 42, delay circuits 44 and 46 and AND gates 48, 50 and 52 for producing pulse signals for subsequent use. The clock pulse generator 42 is arranged to produce a clock pulse train having a predetermined repetition rate T which is equal to the pulse duration of the single pulse, as seen in FIG. 3. The delay circuits 44 and 46 are connected in series to the clock pulse generator 42 so that the clock pulse train delivered therefrom is progressively delayed by a time interval *d*. The delay time will be increased as the number of channels and accordingly the number of associated delay circuits to be used are increased. The AND gates 48, 50 and 52 are disposed in the channels A. B and C, respectively. The AND gate 48 has input terminals (not identified) connected to the input pulse generator 36 of the single pulse generator 10 and directly to the clock pulse generator 42, and an output terminal (not identified) at which the pulse signal appears. The AND gate 50 similarly includes input terminals connected to the input pulse generator 38 and the delay circuit 44, and an output terminal on which the pulse signal appears. Likewise, the AND gate 52 has input terminals connected to the input pulse generator 40 and the delay circuit 46, and an output terminal at which the pulse signal appears. The AND gates 48, 50 and 52 may be of any known arrangement and function to produce the pulse signals on the respective output terminals upon receiving the single pulse and the clock pulse concurrently. It will be appreciated that since the clock pulse train is delayed by the time *d*, the pulse signal appearing on the channel B is delayed by the time interval *d* from the pulse signal appearing on the channel A even if the input pulses overlap with each other when the switch circuits 30 and 32 are closed simultaneously. It will also be seen from FIG. 3 that since the clock pulse train has the pulse repetition rate equal to the pulse duration of the single pulse, one clock pulse is supplied to the input terminal of the AND gate without fail while the single pulse is applied thereto and thus the AND gate does not receive more than two pulses at the same time whereby the pulse interference is avoided. Where N number of channels is employed, the delay time of the clock pulse train is so determined that the relationship between the delay time *d* and the pulse repetition rate T will be $N \cdot d < T$ and that the final clock pulse appearing on the final channel will be prevented from interfering with a next new clock pulse to be applied on the first channel A thus avoiding pulse interference.

The present invention features the pulse signals as separately produced at each predetermined time period equal to the delay time *d* of the clock pulse train and converted into the corresponding binary coded signals in each channel. To this end, the transmitter 16 further includes means consisting of a plurality of coding units 54, 56 and 58 which are provided in the channels A, B and C respectively and which are associated with relative to each other for producing different binary coded signals at respective channels. The coding units 54, 56 and 58 respectively include coding lines **54*a*, 54*b*, 54*c* and 54*d*, 56*a*, 56*b*, 56*c* and 56*d*, and 58*a*, 58*b*, 58*c* and 58*d*, which are connected in parallel to the output terminals of the AND gates 48, 50 and 52, respectively, for receiving and dividing each of the received pulse signals into a plurality of pulse elements. The coding lines 56*a* and 58*a* are connected in parallel to the coding line 54*a*, the coding lines 56*b* and 58*b* to the coding line 54*b*, the coding lines 56*c* and 58*c* to the coding line 54*c*, and the coding lines 56*d* and 58*d* to the coding line 54*d*, respectively. In the preferred illustrated embodiment, each of the coding units is shown and described as consisting of four conding elements by way of example only. It should be understood that the number of coding elements is arbitrary and may be varied to suit system requirements. Diodes 60 are provided in each of the coding lines of the coding units 54, 56 and 58 for the purpose of preventing reverse flow of the electric current therethrough to avoid pulse interference. To perform coding functions, the coding units 54, 56 and 58 include common delay circuits 62, 64 and 66 which delay the divided pulse elements stepwise by a desired time period $\tau$. The time period $\tau$ is preferable selected in a range between $K^{0}\tau<d$ to prevent pulse interference, where K represents the number of coding elements. To cause the binary coded signals to be different from each other, the coding unit 56 includes a NOT gate 68 in the coding line 56*c* while the coding unit 58 includes a NOT gate 70 in the coding line 58*a*. The NOT gates 68 and 70 may be of known construction and function to invert the input pulse elements at their outputs. It should be noted that even when more than three channels are employed, different binary coded signals can be produced by properly selecting the number of NOT gates and by combining these selected NOT gates with the delay circuits in an appropriate manner. The binary coded signals are delivered to an OR gate 72 from which the signals are transmitted in time sequence through the transmission line 18 to the receiver 20**.

Figures 4, 5:
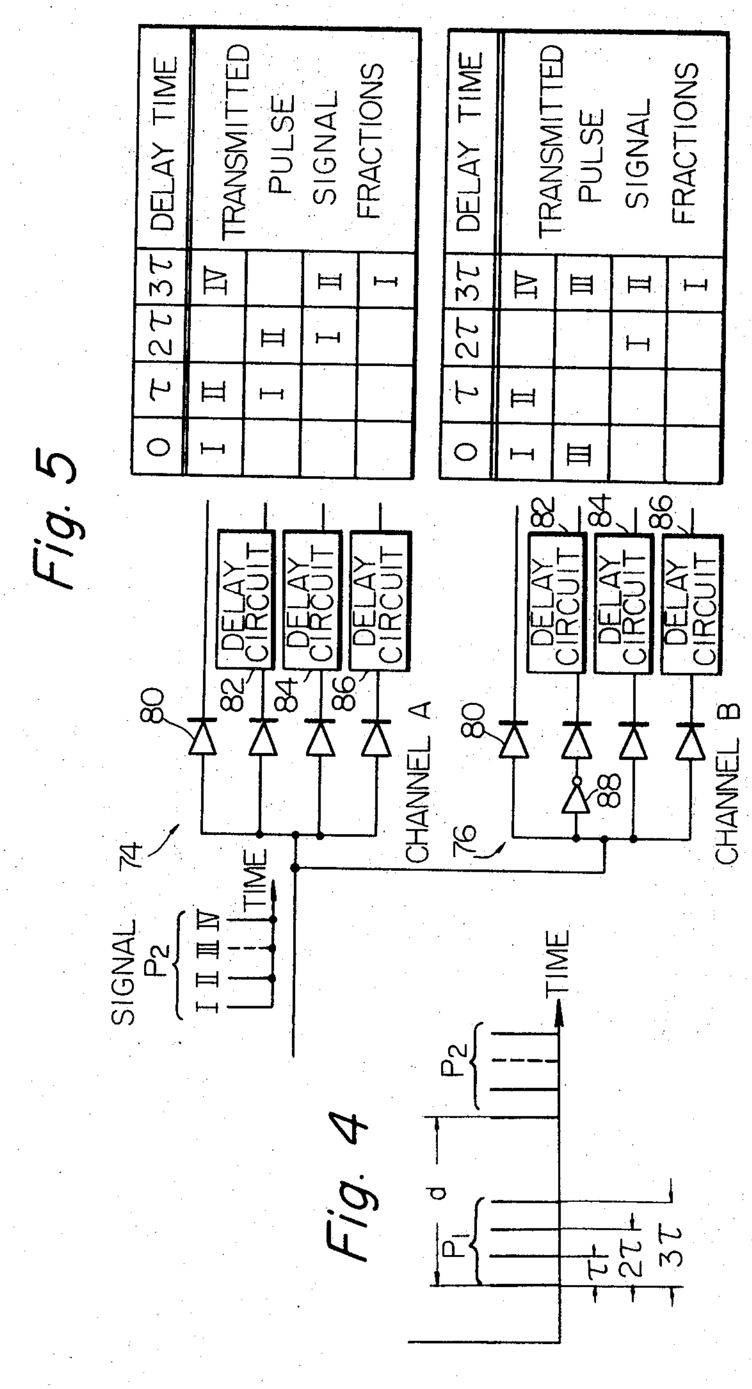
FIG. 4 is an example of binary coded signals which may be obtained by the transmitter shown in FIG. 2A.
FIG. 5 is a view illustrating in detail the relationship between the binary coded signal and the pulse signal to appear on each channel.

FIG. 4 illustrates an example of the binary coded signals and signal fractions delivered from the coding units 54 and 56 of the transmitter 16.

Figure 2B:
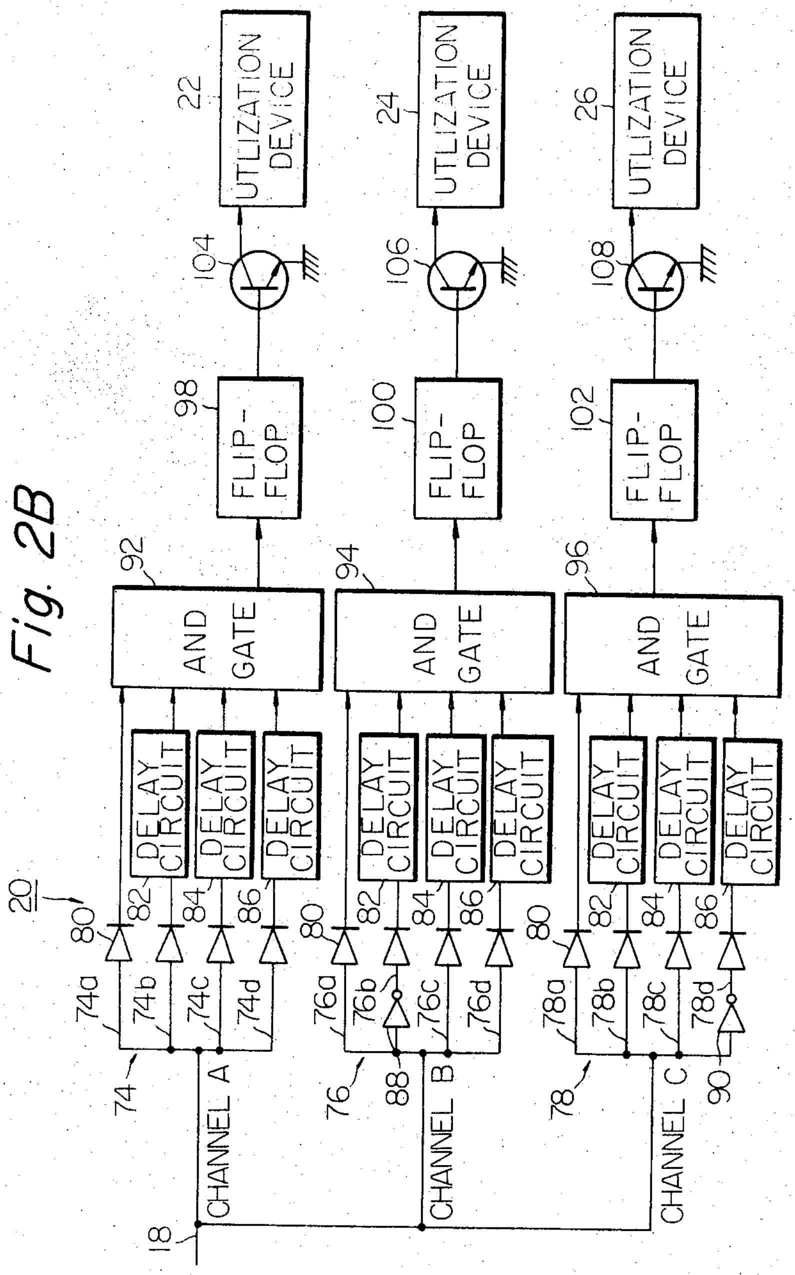
FIG. 2B is a circuit diagram of a receiver forming a part of the system shown in FIG. 1.

The receiver 20 forming a part of the time division multiplex system is shown in greater detail in FIG. 2B. The receiver 20 includes means consisting of decoding units 74, 76 and 78 which are in the channels A, B and C, respectively, and which function to re-convert the binary coded signals into the corresponding original pulse signals. The decoding units 74, 76 and 78 include decoding lines **74*a*, 74*b*, 74*c* and 74*d*, 76*a*, 76*b*, 76*c* and 76*d*, and 78*a* 78*b*, 78*c* and 78*d*, respectively, which are arranged to be equal in number of the coding elements of the transmitter 16. The decoding lines of each decoding units 74, 76 and 78 are connected in parallel to the transmission line 18 for receiving the pulse elements of the transmitted binary coded signals. Diodes 80 are provided in each of the coding lines for preventing pulse interference. The decoding units 74, 76 and 78 further include three delay circuits 82, 84 and 86, respectively, which are arranged to delay the pulse elements of each of the binary coded signals by the time interval $\tau$ which corresponds to the delay time $\tau$ effected by each delay circuit of the coding unit. In the illustrated embodiment, the delay circuits 82, 84 and 86 are shown to be provided in each of the coding units by way of example only. The decoding units 76 and 78 also include NOT gates 88 and 90 which are provided in the decoding lines 76*b* and 78*d*, respectively, so that the position of the pulse elements to be inverted may be changed for the reason discussed below. The decoding units 74, 76 and 78 include AND gates 92, 94 and 96, respectively, which are provided in the channels A, B and C. Each of the AND gates 92, 94 and 96 has four input terminals corresponding in number to the number of decoding lines of each coding unit and an output terminal on which the decoded pulse signal appears. These AND gates are arranged to produce output pulse signals each corresponding to the original pulse signals supplied to the transmitter 16 only when all the input terminals receive the pulse elements of the binary coded signals. The pulse signals appearing at the output terminals of the AND gates 92, 94 and 96 are then delivered to flip-flops 98, 100 and 102 which are provided in each of the ceannels A, B and C, respectively. The flip-flops may be of known arrangement and function to produce an ON or an OFF signal in response to the output pulse signals applied thereto. These signals are passed through transistors 104, 106 and 108 to the utilization devices 22, 24 and 26.**

In describing the operation of the time devision multiplex system of this invention, it is assumed that the switch circuits 30 and 32 are closed while the switch circuit 34 is opened (FIG. 2A). With the switch circuits 30 and 32 closed, the single pulses are present at the channels A and B through which the single pulses are passed to the input terminals of the AND gates 48 and 50, respectively, to the other input terminals of which the clock pulse trains are also supplied from the clock pulse generator 42. Since, in this instance, the clock pulse trains to be supplied to the AND gates 48 and 50 are separated from each other by the delay time $d$ by means of the delay circuit 44, the pulse signal $P_2$ appears at the output terminal of the AND gate 50 later by the delay time $d$ than the pulse signal $P_1$ appearing at the output terminal of the AND gate 48. While the clock pulse train is also supplied by the delay time $2d$ by the action of the delay circuit 46 to the input terminal of the AND gate 52, there is no single pulse at the other input terminal thereof, so that there is no pulse signal at the output terminal of the AND gate 52. The pulse signals appearing at the channels A and B are then passed to the associated coding units 54 and 56 coding at different times. The pulse signal $P_1$ deliverd to the coding unit 54 is divided into a plurality of pulse signal fraction by the coding lines **54*a*, 54*b*, 54*c* and 54*d*. The pulse element appearing on the coding line 54*a* is directly passed to the OR gate 72, while the pulse elements appearing on the coding lines 54*b*, 54*c* and 54*d* are passed through the associated delay circuits 62, 64 and 66 to the OR gate 72. Consequently, the pulse signal fractions are delayed by times $\tau$, 2 $\tau$ and $3\tau$ so that the binary coded signal is produced in the form shown in FIG. 4. Likewise, the pulse signal fraction of pulse signal $P_2$ appearing on the coding line 56*a* is directly delivered to the OR gate 72, while the pulse signal fractions appearing on the coding lines 56*b* and 56*d* are passed through the associated delay circuits 62 and 66 to the OR gate 72. The pulse signal fractioon on the coding line 56*c* is inverted to the binary zero by the action of the NOT gate 68, so that the binary coded signal is produced in the form shown in FIG. 4. As previously discussed, each of these binary coded pulse signal fractions is produced at time intervals of $\tau$ within the delay time $d$, and therefore, the pulse interference between adjacent pulse signal fractions can be avoided. The binary coded signals $P_1$ and $P_2$ are delivered to the OR gate 72 the output signal of which is then transmitted through the transmission line 18 to the decoding units 74 and 76 of the receiver 20. With the binary coded signal $P_1$ being transmitted to the channel A, the first pulse signal fraction of the binary coded signal $P_1$ is passed through the delay circuit 86 to the input terminal of the AND gate 92 so that the first pulse signal fraction is delayed by time $3\tau$. The second pulse signal fraction is passed through the delay circuit 84 to the input terminal of the AND gate 92 and delayed by time $2\tau$. Similarly, the third pulse signal fraction is passed through the delay circuit 82 to the input terminal of the AND gate 92 and delayed by time $\tau$. The fourth pulse signal fraction is directly delivered to the input terminal of the AND gate 92. Thus, all the pulse signal fractions of the binary coded signal $P_1$ are supplied to the respective input terminals of the AND gate 92, which consequently produces an output pulse at its output terminal corresponding to the original pulse signal. In the same fashion, the first pulse signal fraction of the binary coded signal $P_2$ transmitted to the channel B is passed through the delay circuit 86 to the input terminal of the AND gate 94, so that the same is delayed by time $3\tau$. The second pulse signal fraction is passed through the delay circuit 84 an thus the same is delayed by time $2\tau$. The third pulse signal fraction appearing in the decoding line 76*b* in the form of binary zero is inverted to the binary one and is passed through the delay circuit 82 to the input terminal of the AND gate 94. The fourth pulse signal fraction is passed direclty to an input terminal of the AND gate 94. Therefore, all the pulse signal fractions of the pulse signal $P_2$ appear at the input terminals of the AND gate 94** at the same time and thus, the output pulse signal corresponding to the original pulse signal is obtained.

The operation of the receiver 20 will be more clearly understood by referring to FIG. 5. Let it be assumed that only the binary coded signal $P_2$ is transmitted to the receiver 20. Since the pulse signal fraction, indicated at III in FIG. 5, is binary zero, the AND gate 92 in the channel A receives the pulse elements designated at I, II and IV so that there is no output pulse developed at the output terminal thereof. On the other hand, the first, second and fourth pulse signal fractions of the binary coded signal $P_2$ are supplied to the input terminals of the AND gate 94 in the same fashion as in the channel A. The third pulse signal fraction III, which is orginally binary zero, is inverted to the binary one by the action of the NOT gate 88. The third pulse signal fraction thus inverted to the binary one is passed through the delay circuit 82 and delayed thereby the time $\tau$. Accordingly, all the four pulse signal fractions are concurrently present at the respective input terminals of the AND gate 94, so that an output pulse is developed at its output terminal.

It will now be appreciated that the time divison system according to this invention is highly reliable in operation without requiring a complicated synchronization device and extremely simplified in construction by the use of a minimum number of component parts. It will also be understood that the system implementing this invention is applicable to a large variety of utilization devices including an educational machine.

What is claimed is:

1. A time division multiplex transmission system for transmitting and receiving different instruction through respective channels, comprising:

single pulse generating means for generating separate single pulse signals carrying said instructions provided in each of said channels, each of said single pulse signals having a predetermined pulse duration;

a transmitter connected to said single pulse generating means and including first means for producing pulse signals each within said predetermined pulse duration, said pulse signals being separated from each other by a predetermined delay time and appearing on each of said channels and second means for converting said pulse signals into corresponding binary coded pulse signal fractions each appearing on each of said channels within a time period less than said predetermined delay time, said second means comprising a plurality of coding units each provided in each of said channels, one of said coding units including a plurality of n parallel-connected basic rectifiers connected to one of said channels for dividing said pulse signal into a plurality of *n* signal fractions and delay circuits provided in *n*—1 of said basic rectifiers for delaying said pulse signal fractions progressively by a predetermined time interval, the sum of said predetermined time intervals being less than said predetermined delay time, another coding unit including a plurality of n parallel-connected additional rectifiers connected to another channel and also connected in parallel to outputs of said basic rectifiers, at least one of said additional rectifiers being connected in series to an inverter for inverting at least one of the pulse signal fractions thereby to differentiate the binary coded signals from each other; and a receiver connected to said transmitter and including third means for receiving and re-converting the transmitted binary coded pulse signal fractions into corresponding said pulse signals.

2. A time division multiplex transmission system according to claim 1, wherein said single pulse generating means comprises a switch circuit provided in each of said channel and an input pulse generator connected to said switch circuit and associated therewith for producing said single pulses.

3. A time division multiplex transmission system according to claim 2, wherein said first means comprises a clock pulse generator for producing a clock pulse train having a predetermined repetition rate equal to said predetermined pulse duration of said single pulse, delay circuits provided between AND gates of said channels, and connected to said clock pulse generator for delaying said clock pulse train by said predetermined delay time, and AND gates each provided in each of said channels and having two input terminals and one output terminal respectively, one of said two input terminals of one of said AND gates being connected to one of said input pulse generators and the other one to said clock pulse generator, and one of the two input terminals of the other AND gate being connected to the other of said input pulse generators and the other one to said delay circuit associated with said clock pulse generator.

4. A time division multiplex transmission system according to claim 3, wherein said third means comprises a plurality of decoding units, one of said decoding units including a plurality of *n* parallel-connected basic rectifiers corresponding to the number of *n* basic rectifiers of said coding unit, delay circuits provided in *n*—1 of said basic recitifiers of said decoding unit for delaying said pulse signal fractions of the transmitted binary coded signal from each other progressively by a time interval equal to said predetermined time interval, and an AND gate having the input terminals connected to said basic rectifiers of said decoding unit and an output terminal at which the decoded pulse signal appears, and the other of said decoding units including a plurality of n parallel-connected additional rectifiers, delay circuits provided in *n*—1 of said additional rectifiers, at least one of the additional rectifiers being connected in series to an inverter so as to associate with said inverter of said coding unit, and an AND gate having its input terminals connected to said additional rectifiers of said decoding unit and an output terminal at which the pulse signal appears.

* * * * *